United States Patent
Russwurm

[11] Patent Number: 5,351,560
[45] Date of Patent: Oct. 4, 1994

[54] ULTRASONIC FLOW METER

[75] Inventor: Winfried Russwurm, Regensburg, Fed. Rep. of Germany

[73] Assignee: Siemens Aktiengesellschaft, Munich, Fed. Rep. of Germany

[21] Appl. No.: 861,861

[22] PCT Filed: Dec. 13, 1990

[86] PCT No.: PCT/EP90/02179
§ 371 Date: Sep. 15, 1992
§ 102(e) Date: Sep. 15, 1992

[87] PCT Pub. No.: WO91/09281
PCT Pub. Date: Jun. 27, 1991

[30] Foreign Application Priority Data
Dec. 15, 1989 [DE] Fed. Rep. of Germany ....... 3941544

[51] Int. Cl.$^5$ ................................ G01F 1/00
[52] U.S. Cl. ........................... 73/861.27; 73/861.18
[58] Field of Search ........... 73/861.26, 861.27, 861.28, 73/861.29, 861.31

[56] References Cited

U.S. PATENT DOCUMENTS
4,555,951 12/1985 Gutterman ....................... 73/861.28
4,596,133  6/1986 Smalling et al. ................ 73/861.18
4,754,650  7/1988 Smalling et al. ................ 73/861.28

FOREIGN PATENT DOCUMENTS
61-28821  8/1986 Japan .
2146122  11/1985 United Kingdom .

OTHER PUBLICATIONS
Siemens AG, (1986) pp. 126–134 "Ultraschallsensor für hochauflösende Durchflussmessung" by Jena.

Primary Examiner—Richard E. Chilcot, Jr.
Assistant Examiner—R. Biegel
Attorney, Agent, or Firm—Hill, Steadman & Simpson

[57] ABSTRACT

Ultrasonic flow meter having a W-shaped ultrasonic path in the measurement tube (1) and having a stepped elevation/depression of the inner wall of the tube at the site of reflection of the parasitic V-shaped path.

2 Claims, 2 Drawing Sheets

ULTRASONIC FLOW METER

BACKGROUND OF THE INVENTION

The present invention relates to an ultrasonic flow meter having a measurement tube through which gas/liquid flows and having ultrasonic emission/reception transducers, which, for a "W" shaped ultrasonic path with multiple reflections provided within the measurement tube, are located at a given spacing from one another on a common side wall of the measurement tube.

Flow meters operated by ultrasound are known from the prior art and are proposed in PCT application PCT/EP90/02178 filed 13 Dec. 1990 and in the parallel patent applications GR 89 P 2014 DE and GR 89 P 2015 DE. The content of the specifications of these applications is an additional component part of the present invention specification.

The flow meters consist essentially of a tube through which the pertinent medium flows and within the interior of which an acoustic path extends. The influencing of the ultrasound by the flowing medium is the parameter from which, for example, the volume of gas or liquid flowing through the tube cross section per unit time is to be ascertained. Such flow meters are suitable, for example, as gas flow meters such as, for example, as domestic gas meters.

The aforementioned acoustic measurement path is formed between an acoustic emission transducer and an acoustic reception transducer. The emission transducer and reception transducer are fitted in a manner known per se to the side wall of the tube through which the medium flows, and specifically in such a manner that an acoustic beam is passed from the emission transducer into the interior of the tube, with a component oriented parallel to the direction of flow. Oblique injection of the ultrasound is the method in widespread use; in this case, the ultrasound is reflected at the opposite wall of the tube and executes, for example with three successive reflections at the inner wall of the tube, an in total W-shaped path between the emission transducer and the reception transducer.

The evaluation of the influencing of the ultrasound by the flow takes place, as a rule, in such a manner that the measurement path is traversed by the ultrasound alternately in a downstream and upstream direction, and the difference value resulting from the influencing of the flow, for the two ultrasound measurements, is the evaluation signal. Thus, the emission transducer and reception transducer are used interchangeably in terms of operation.

The aforementioned W-shaped path is preferred as against an only V-shaped path, because advantages can be achieved with a predetermined spacing, axial when related to the tube axis, between the emission transducer and the reception transducer. It is also possible to provide an ultrasound path with, instead of three reflections, even more reflections, especially an odd number thereof. In this case, it is essential that the ultrasonic transducers do not directly "see" one another, i.e. that ultrasound does not pass without reflection from the respective emission transducer to the pertinent reception transducer.

If use is made of the W-shaped ultrasound path 21 in an arrangement for example as shown in FIG. 1, in which the lower and upper tube wall in the Figure are designated by 4 and 5 and the transducers are designated by 11 and 12, then a signal transmission unavoidably also takes place via the V-shaped path 22 between the emission transducer and the reception transducer. This is based on the fact that the radiation lobes of the emission transducer and the reception lobe of the reception transducer cannot be directed with an arbitrarily selectable degree of sharpness.

In the two aforementioned older patent applications, proposals have been made for the most extensive possible suppression of a parasitic signal of the V-shaped path as compared with the useful signal of the W-shaped path. On the one hand, this involves the use of a markedly rectangular tube cross section, with a ratio of height H to width B exceeding 2:1 to 15:1, preferably 5:1 to 6:1. In addition, such a rectangular cross section has the advantage of acting in a homogenizing manner on the ultrasonic transirradiation of the respective flow cross section. In the other application, it is proposed, in the case of a measurement tube having a not necessarily rectangular cross section, to arrange the transducers 11 and 12 of FIG. 1 in an appropriately modified manner in a "misdirected position". In FIG. 1, the transducers are disposed with respect to their axial spacing from one another and with respect to the angular orientation of their radiatively emitting surfaces 111 and 112 so that the end sections of the W-shaped path do not coincide with the respective normal to these surfaces 111, 112. The misorientation consists in dimensioning the axial spacing to be greater, and/or arranging the transducers 11, 12 with their surfaces 111, 112 "misoriented" at an angle, i.e. tilted, in comparison with the angular orientation of the transducers of FIG. 1. It is also possible to provide these two measures in combination.

SUMMARY OF THE INVENTION

The object of the present invention is to provide a further measure for the suppression of the signal of the parasitic V-shaped path as compared with the useful signal of the W-shaped path. In particular, the object is to achieve the most effective possible, up to virtually complete, suppression of the parasitic signal.

This object is achieved by the following described ultrasonic flow meter. In order to reduce/eliminate the disturbing signal of a parasitic "V"-shaped ultrasonic path which, as is known, occurs within the measurement tube, in the interior of the tube at a tube wall, which is opposite a tube wall provided with the transducers and at which a reflection of a V-shaped path occurs, in the region of the reflection of the V-shaped path an elevation/depression is provided that extends over one half component of this reflection region. The elevation/depression is on the inner wall of the tube and has a step height. The step height is dimensioned so that for ultrasonic radiation of the "V"-shaped path extinguishing interference occurs between the radiation reflected at the half component on the one hand and the radiation reflected at the remaining half component of this reflection region on the other hand.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, and in which:

DESCRIPTION OF THE PREFERRED EMBODIMENT

Figure 1:
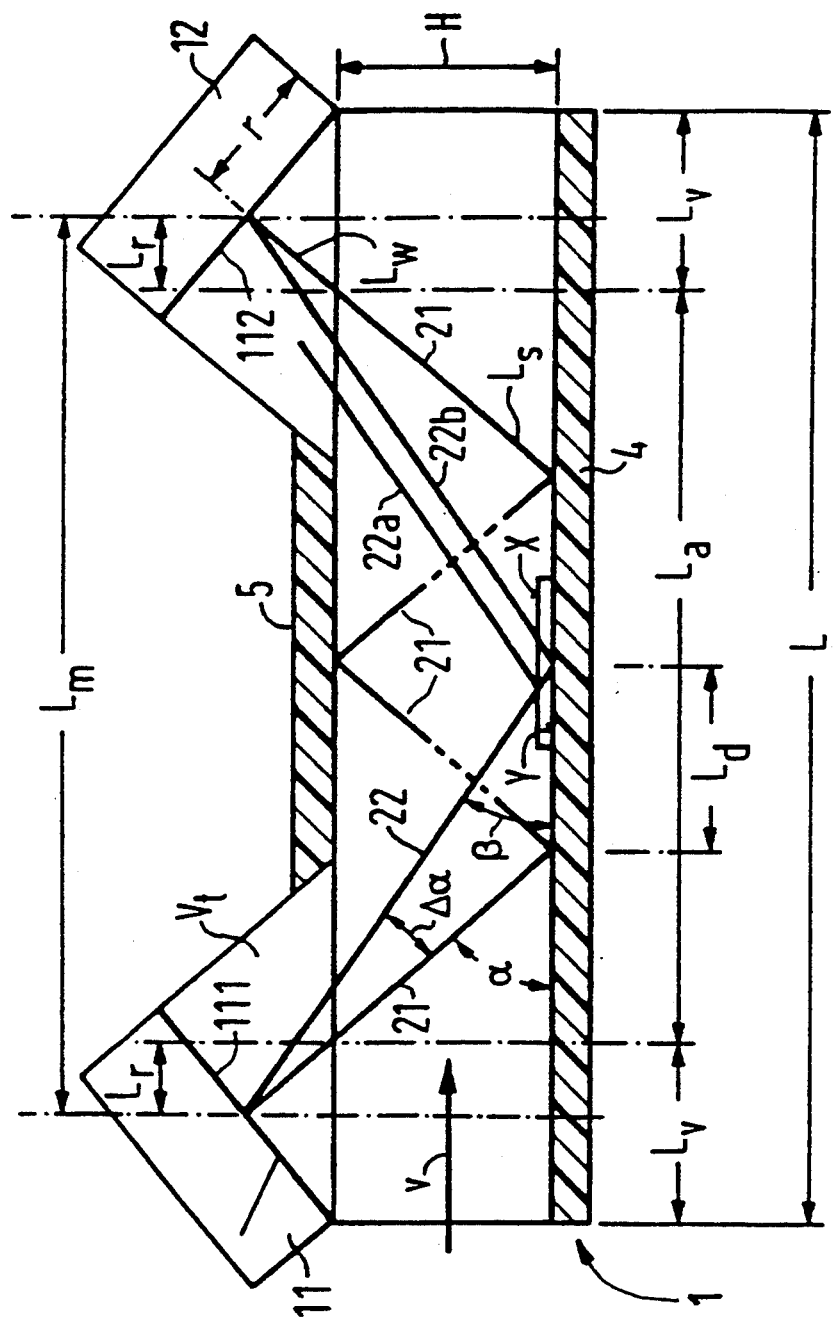
FIG. 1 and 1a are cross-sectional views of an ultrasonic flow meter according to the present invention.

As is evident from FIG. 1, the axial position of the reflection locations of the W-shaped path, and specifically of the reflections at the tube wall opposite to the transducers, is different from the corresponding reflection location of the V-shaped path.

An attempt has already been made to provide at the location of the reflection of the V-shaped path at the inner wall of the tube sound-absorbing components such as, for example, a felt covering. However, such a measure has proved to be disadvantageous to the flow and also lacked the required service life. Furthermore, the attainable signal attenuation was only moderate. Structuring of the inner wall of the tube, specifically to avoid directional reflection, also does not lead to any result useful in practice.

Figure 1A:
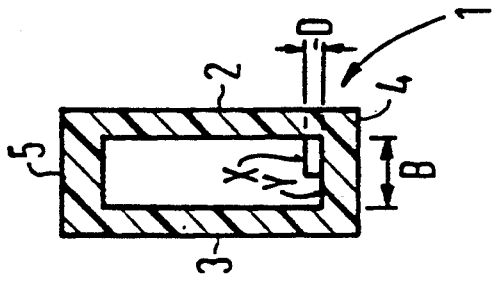

The invention is based on the idea of achieving, by means of interference, a to a large extent total extinction of the acoustic signal of the V-shaped path. According to the invention, an insertion is undertaken in the interior of the tube at the tube wall at the pertinent site of the reflection of the V-shaped path, which insertion splits up that surface of the inner wall of the tube which enters into consideration for the purposes of reflection into at least two, but preferably only two components or halves. Preferably, the original inner wall of the tube forms one of the halves, and the other half is the surface, raised by the amount D (see FIG. 1a), of a packing of the inner wall of the tube. It is also possible to provide a corresponding depression which, however, is more onerous in preparation. FIGS. 2a, 2b, 3a, 3b, 4a, 4b and 5a, 5b show examples of such a splitting-up, and specifically FIGS. 2a to 5a in plan view onto the inner wall at the site of the reflection of the V-shaped path and FIGS. 2b to 5b the associated sections a and a'. These representations reveal the significance of the dimension D, without this requiring any further explanations. In FIGS. 2a, 3a, 4a and 5a a part of the V-shaped path 22 has been shown. For the surface components X and Y there are formed, after reflection, two parallel ultrasound paths 22a and 22b. The thickness is dimensioned as a function of the angle $\beta$ so that these two paths 22a and 22b are in extinguishing interference with one another. Preferably, the first-order interference is used.

Figure 3B:
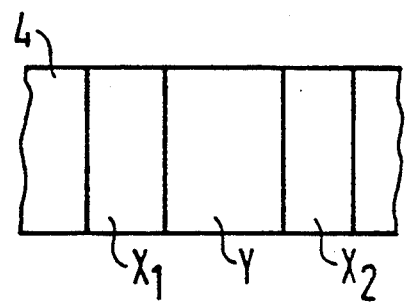
FIG. 3b depicts the splitting of the reflection at the FIG. 3a site.
Figure 5A:
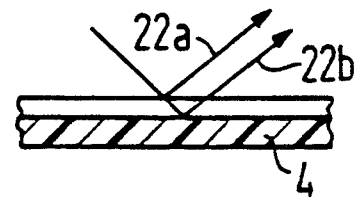
FIG. 5a is a plan view of another embodiment of an inner wall of the FIG. 1 flow meter at the site of reflection of the V-shaped path.
Figure 5B:
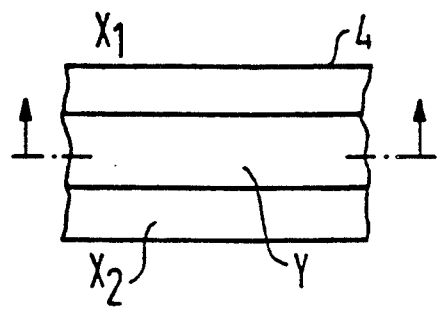
FIG. 5b depicts the splitting of the reflection at the FIG. 5a site.

The component X and/or Y can, per se, be split up in terms of area once more, as is shown, for example, by FIGS. 3b and 5b. In this manner, it is possible to achieve an even greater measure of reliable extinction. In any event, it is necessary to apply the rule that the intensity reflected at the surface component X must be equal to the intensity reflected at the surface component Y; in this case, it has to be borne in mind that a non-uniform intensity distribution prevails within the total reflecting surface.

At acoustic wavelengths of lambda approximately equal to 2 mm, corresponding to a frequency of 170 kHz in air, the step height Dk is smaller than/equal to 1 mm with customary dimensions for the angle beta. As regards the flow, an insertion of such dimensions in the interior of the tube is insignificant and leads to at most a slight disruption of the flow. The explanation "interference of acoustic waves" given hereinbelow is to be taken as a basis for the dimensioning.

Interference of acoustic waves

The following is applicable:

$$c = f \times \lambda$$

where c is the velocity of sound in the respective medium, f is the transducer frequency and $\beta$ is the wavelength in the medium.

Two acoustic waves of the same direction of propagation, frequency and amplitude extinguish one another if they possess a path difference of $$\delta = \frac{(2k+1) \times \lambda}{2} \qquad k = 0, 1, 2 \ldots$$

In the case of normal incidence, this path difference $\delta$ is achieved for the spacing $$D = \frac{(2k+1) \times \lambda}{4} \qquad k = 0, 1, 2 \ldots$$

of the two reflection planes, i.e. at k=0 for D=$\lambda$/4.

Having regard to the angle of incidence $\beta$ of the signal of the V-shaped path applicable in the measurement tube, the height D required for extinction is computed from:

$$D_k = \frac{\sin\beta(2k+1)\lambda}{4} \qquad k = 0, 1, 2 \ldots$$

or, having regard to the various media, may be represented as:

$$n_k = \frac{\sin\beta(2k+1)c}{4f} \qquad k = 0, 1, 2 \ldots \qquad (1)$$

This interference phenomenon is used to suppress the signal of the V-shaped path. To this end, the direction of propagation can be regarded as being almost constant for all participating acoustic waves. For the sake of simplicity, only the center frequency of the transducer resonance has been taken into consideration in the present treatment.

On account of the large jump in impedance from air to solid materials where sound is concerned, a partial reflection at the upper and lower surface of a thin layer is not possible (such as, for example, in optics at thin layers). Accordingly, the wave front is not reflected for example at a uniformly coated surface, but the reflecting surface is subdivided into two regions of equal surface content, of which one surface is displaced by the offset D in relation to the other (FIG. 2a and 2b) and thus a path difference is generated. The phase jump of $\lambda/2$ upon reflection at the denser medium occurs in this case with both components, and accordingly does not need to be taken into consideration. The path difference leads, in the direction towards the reception transducer, to the mutual extinction of the two components of the signal of the V-shaped path which are reflected at the two partial surfaces, and thus to its effective suppression.

Discussion of application in the measurement tube

Typical values for a measurement tube to be used here are $L_m = 174$ mm, $r = 7$ mm and $h = 30$ mm, as well as $\alpha = 35°$, and this gives $\beta = 21.4°$. At room temperature, the velocity of sound in air is $c = 340$ m/s and in methane $c = 440$ m/s. For transducers with $r = 7$ mm, a radial resonant frequency $f \approx 170$ kHz is in practice specified. According to (1), this gives for extinction of the signal of the V-shaped path the possible elevations $D_k$ in air $D_0 = 0.182$ mm, $D_1 = 0.546$ mm, $D_2 = 0.912$ mm, $D_3 = 1.277$ mm and in methane $D_0 = 0.236$ mm, $D_1 = 0.708$ mm, $D_2 = 1.180$ mm, $D_3 = 1.652$ mm. For a good suppression in both media, and for all velocities of sound in the intermediate range, it is possible to select, for example $D \sim 0.2$ mm or $D \sim 0.6$ mm. Depending upon the particular requirements, it is also possible to match D precisely to a specified medium. The aforementioned values of D signify an only slight insertion into the flow. For ultrasonic transducers with $r = 10.5$ mm and $f \sim 130$ kHz, the result is $\beta = 23.9°$. According to (1), this gives in air $D_0 = 0.265$ mm, $D_1 = 0.796$ mm, $D_2 = 1.326$ mm, and in methane $D_0 = 0.343$ mm, $D_1 = 1.03$ mm, $D_2 = 1.716$ mm, so that for a good suppression in both media and in the intermediate range, for example, $D \sim 0.3$ mm or $D \sim 0.9$ mm should be selected.

Example of measurement: At $\beta = 21.4°$ and $r = 7$ mm, i.e. for transducers with $f \sim 170$ kHz, the length of the surface of incidence emerges as 39 mm. With a step height of $D = 0.6$ mm at a length of 15–20 mm, excellent results were achieved. The signal of the V-shaped path may be attenuated by approximately 18 dB by using the $3\lambda/4$ plate ($D = 0.6$ mm).

Possible embodiments of the raised surface

Figure 2A:
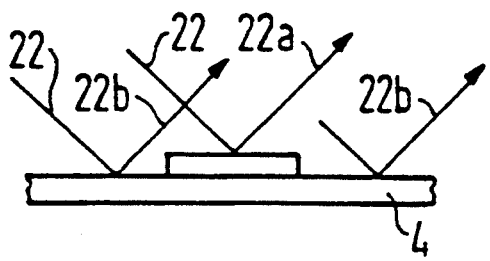
FIG. 2a is a plan view of one embodiment of an inner wall of the FIG. 1 flow meter at the site of reflection of the V-shaped path.
Figure 3A:
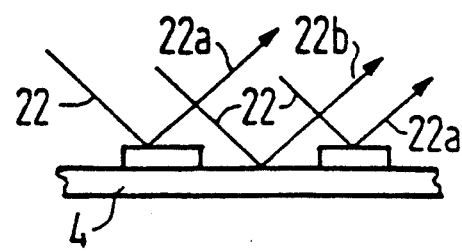
FIG. 3a is a plan view of another embodiment of an inner wall of the FIG. 1 flow meter at the site of reflection of the V-shaped path.
Figure 2B:
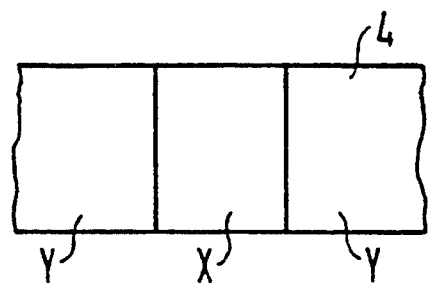
FIG. 2b depicts the splitting of the reflection at the FIG. 2a site.
Figure 4A:
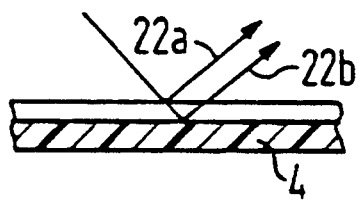
FIG. 4a is a plan view of another embodiment of an inner wall of the FIG. 1 flow meter at the site of reflection of the V-shaped path.
Figure 4B:
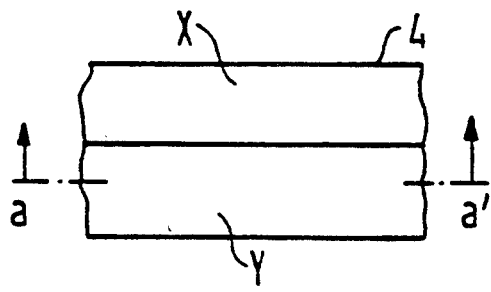
FIG. 4b depicts the splitting of the reflection at the FIG. 4a site.

In addition to the embodiment shown in FIGS. 2a and 2b, further variations of the apportionment of the surface are also feasible. FIG. 2b shows once again the form shown in FIG. 2a, in which the sequence not raised/raised/not raised occurs in the direction of flow. FIG. 3b shows an arrangement complementary thereto, having a sequence raised/not raised/raised. Also feasible would be arrangements having a sequence transversely to the direction of flow. FIG. 4b shows, in this sense, an arrangement raised/not raised. FIG. 5b shows an arrangement raised/not raised/raised. A sequence of the various surfaces transversely to the direction of flow would signify less insertion into the flow.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An ultrasonic flow meter having a measurement tube through which a fluid flows and having ultrasonic transducers operable as transmission transducers and reception transducers, which, for a "W"-shaped ultrasonic path with multiple reflections provided within the measurement tube, are positioned at a given spacing from one another on a common side wall of the measurement tube, comprising:

in order to at least reduce a disturbing signal of a parasitic "V"-shaped ultrasonic path which occurs within the measurement tube, means for providing at least one of an elevation and a depression of an inner wall of the measurement tube that is located in the interior of the tube at a tube wall which is opposite the side wall provided with the transducers and at which a reflection of a V-shaped path occurs, said means extending over a first half component of a reflection region of the V-shaped path, said means having a single step height, the single step height being dimensioned so that for ultrasonic radiation of the "V"-shaped path extinguishing interference occurs between radiation reflected at said first half component of said means and radiation reflected at a remaining second half component of the reflection region.

2. The ultrasonic flow meter according to claim 1, wherein at least one of the first and second half components of the reflection region comprises individual surface components.

* * * * *